March 1, 1949. K. K. PROBST 2,463,310
INDEPENDENTLY SUSPENDED MOTOR
VEHICLE CHARACTERIZED BY
A LOW CENTER OF GRAVITY
Filed Feb. 7, 1944

INVENTOR.
Karl K. Probst.
BY
Harness, Dickey & Pierce.

Patented Mar. 1, 1949

2,463,310

UNITED STATES PATENT OFFICE 2,463,310

INDEPENDENTLY SUSPENDED MOTOR VEHICLE CHARACTERIZED BY A LOW CENTER OF GRAVITY

Karl K. Probst, Highland Park, Mich., assignor to Henry J. Kaiser Company, Oakland, Calif., a corporation of Nevada Application February 7, 1944, Serial No. 521,333

5 Claims. (Cl. 180—45)

The invention relates generally to motor vehicles, and it has particular relation to a power-driven vehicle having a low center of gravity.

At the present time it is quite important to provide vehicles which can be maneuvered and driven easily and quickly with considerable power and speed. Due to the fact that such vehicles are used often on very uneven ground and are turned quickly on occasion at sharp angles, it is important too that the vehicle not easily overturn. Again, it is important to be able to manufacture and assemble the vehicle easily and rapidly, and necessarily it is desirable that the number of parts be reduced to a minimum and that where possible such parts be interchangeable. Interchangeability means that replacement and repair stocks may be reduced, and furthermore it means that manufacture and installation may be effected more efficiently and with greater speed.

The present invention has for one object the provision of a small vehicle which has a lower center of gravity so as to still further reduce the danger of the vehicle turning over.

Another object of the invention is to provide a vehicle having greater stability due to the provision of independent wheel suspensions in conjunction with the lowering of the center of gravity.

Another object of the invention is to provide a vehicle wherein all four wheels are driven by shafts which are interchangeable one with another so as thereby to reduce the cost of manufacture, installation, and replacement or interchanging of parts.

Another object of the invention is to provide an improved vehicle having a silhouette which is lowered substantially without decreasing the critical ground clearance under the vehicle.

Another object of the invention is to provide a vehicle having an engine and drive shafts which are adaptable either with the engine at the rear or at the front.

Other objects of the invention will become apparent from the following specification, from the drawings relating thereto, and from the claims hereinafter set forth.

For a better understanding of the invention, reference may be had to the accompanying drawings wherein:

Figure 1 is a plan view with certain parts broken away, illustrating a vehicle constructed according to one form of the invention.

Figure 2 is a side elevational view of the structure shown in Figure 1.

Referring to the figures, the chassis frame of the vehicle illustrated is indicated at 10, and this frame comprises laterally spaced side members 11 and 12 dropped along their central parts and joined together at their front and rear ends by rigid bumpers 13 and 14, respectively. Each of the side frame members in the region of the vehicle center includes laterally spaced branches 16 and 17, and this arrangement provides a laterally greater expanse of frame structure. This not only effects a greater lateral rigidity in the frame but also provides a better arrangement for fastening drive shafts and other parts to the frame. Cross frame elements 20, 21, and 22 may be provided at the front, center, and rear end of the frame for additionally increasing the lateral rigidity and also for providing a supporting structure for differentials and parts of the engine.

An engine 23 is shown mounted on the front end of the frame, and it should be understood that the engine may be supported on the side frame members 11 and 12 and on any additional cross frame members which may be provided as desired, including the cross frame member 21. The drive shaft of the engine extends into a regular three-speed gear box 24 at the rear of the engine, and shifting of gears may be effected in the usual manner by means of a lever 25 and clutch operating pedal 26. A drive shaft 27 extends rearwardly from the box 24, and this shaft is connected to a universal joint 28 which in turn is connected to a shaft 29 extending into a transfer box 30. This transfer box may be suitably fastened on the portion 16 of the two side frame members substantially at the longitudinal center of the vehicle, and for securing the box to such frame members, straps or other suitable elements 31 may be used.

As seen best in Figure 2, the transfer box includes two additional shafts 32 and 33 with the shaft 32 axially aligned with the shaft 29 and 27 and extending to the rear end of the vehicle. The shaft 33 is vertically below the shaft 27 and is connected to a universal joint 34 which in turn is connected to a shaft 35 extending to the front of the vehicle. A universal joint also may be provided for the shaft 32 adjacent the transfer box if this is found desirable. The particular structure embodied in the transfer box forms the subject matter of a separate application for patent filed by me, Serial No. 521,332, filed February 7, 1944, and it seems unnecessary to illustrate and describe the internal structure of that transfer box here. Generally it may be noted, however, that the transfer box is of such character that the shaft 32 may be driven at the same speed as the shaft 27 so as to drive the rear wheels by a direct driving connection with the shaft 27, or both shafts 33 and 32 may be driven together but substantially at half the speed of the shaft 27. As will be seen presently, the rear shaft 32 drives the rear wheels, and the front shaft 33 drives the front wheels, and therefore, by selective operation of the transfer box, all four wheels may be driven at about half the speed of the shaft 27, or the rear wheels only may be driven at the same speed as the latter shaft. A control lever 36 on the transfer box enables selective operation so as to obtain the four-wheel drive or the two-wheel drive as desired.

At its rear end, the shaft 32 extends to a differential 39 shown best by Fig. 1 which may be fastened to the cross frame member 22 by means of a strap 41 or the like. At one lateral side a shaft 40 extends from the differential, and this is connected to a universal joint 42 which in turn is connected to a shaft 43. The latter shaft at its outer end is connected to a universal joint 44, and this in turn is connected to a wheel axle 45 which is drivingly connected to one of the rear wheels 46. At the opposite lateral side of the differential, a second shaft 48 extends therefrom and is connected to a universal joint 49, and the latter in turn is connected to a laterally extending shaft 50. The shaft 50 is connected to a universal joint 51, and this joint in turn is connected to a second wheel axle 52 drivingly connected to the other rear wheel 53. From this it will be apparent that both wheels may be driven when the shaft 32 is driven.

Each of the wheels 46 and 53 is mounted on the frame by means of an individual wheel suspension including upper and lower arms 55 and 56 which are pivotally connected at 57 and 58 to the frame for swinging movement in a plane directed longitudinally of the vehicle. The opposite ends of the arms 55 and 56 are pivotally connected, as indicated at 60 and 61, to a wheel mounting member 62 in which the axle is journaled for rotation. The suspension may include rubber and spring torsion elements 63 and 64 which resiliently resist swinging of the arms 55 and 56 and hence resiliently support the rear end of the vehicle. In other words, it should be generally understood that upward and downward movement of the frame and wheels relatively is permitted through swinging of the arms 55 and 56, while at the same time the frame is resiliently supported on the wheels by means of the spring and rubber torsion elements which resist swinging of the arms. The particular individual suspension generally described here is embodied in a separate application for patent filed by me, Serial No. 521,331, filed February 7, 1944, and entitled Vehicle suspension.

The above described type of suspension, in which the wheels are supported on crank arms swinging in planes in parallel to the longitudinal axis of the frame, in combination with the disposal of the differentials and engine on the frame gives a low silhouette with maximum road clearance, and a high degree of stability even under adverse road conditions.

The front shaft 35 at its front end is connected to a universal joint 65, and a shaft 66 connected to the joint at the advance side of the latter extends into a front differential 67. This differential is fastened to the frame member 20 by strap elements 68 or the like. Attention is particularly directed to the fact that the differential 67 is directly under the engine and that it is directly mounted on the frame so that the engine, differential, and frame move as a unit or entity. Since there is no spring mountings separating the differential from the frame, and since the differential has no vertical relative movement with respect to the frame, vertical clearance between the engine and differential may thus be reduced to substantially nothing. As shown in the drawings, the differential only has slight clearance with the under side of the engine, and hence the engine and differential are brought into close, vertically compact relation. This arrangement permits lowering the engine while still maintaining the critical ground clearance between the differential and the ground, and accordingly the center of gravity of the vehicle may be lowered substantially.

Moreover, by mounting the rear differential 39 directly on the frame, any parts above the frame, such as a seat or other body parts, may be lowered. As a result the engine, transfer box, all connecting shafts, and the two differentials may be lowered substantially, and this also permits lowering any body parts which are above the differentials and shafts. It follows that the center of gravity and entire silhouette of the vehicle may be lowered to a considerable degree while still maintaining the critical ground clearance between the differentials and the ground.

At opposite sides of the differential 67, wheel driving shafts 69 and 70 extend from the differential to the wheels, and a universal joint 71 connects the inner end of each of the shafts 69 and 70 to a shaft projecting from the differential. At the outer end of each of the shafts 69 and 70 a second universal joint 72 is provided, and this joint is in turn connected to a wheel axle 73. Such axle is drivingly connected to opposite wheels 74 and 75 respectively. Each of the wheels 74 and 75 may be mounted on the frame by individual suspension means of the same type as shown and described in connection with the rear wheels, excepting that in the case of the front wheels the wheel mounting member indicated at 77 has a king pin connection to a knuckle bracket 78 which is connected to the arms 55 and 56 of the suspension. The king pin connection to the knuckle bracket 78 and the transverse axis of the universal joint 72 are substantially in vertical alignment to provide the desired drive to the dirigible front wheels. This arrangement is brought out in more detail in the application for patent on Vehicle suspension mentioned previously.

While the chassis frame and structure already described may be used in connection with different bodies, the drawings illustrate in broken lines at 79 a "jeep" structure having a hood 80, windshield 81, steering wheel 82, seat 83, and rear body part 84. A braking mechanism is also employed including a pedal 88, and it will be understood that the usual four-wheel hydraulic brake system may be used. Control of the two-speed transfer 30 is governed as mentioned before by a level 36. With this lever in such position that all four wheels are driven at half the speed of shaft 27, it will be apparent that greater power may be obtained especially in the low and second gears of the transmission 24. Likewise, rapid speed may be obtained when the transfer box 30 is in such condition that the shaft 27 directly drives the shaft 32, in which event driving of the rear wheels through the transmission will be the same as if the shafts 27 and 32 were directly connected without the transfer box.

While it has been stated that the engine 24 is at the front end of the vehicle, it should be understood that the engine may be at the rear end and that the shafts 27, 32, and 35 along with the transfer box may be turned around in position. Since the shafts 43, 50, 69, and 70 are identical and interchangeable, it is only necessary, in the event the engine is placed at the rear end instead of the front end, to use differentials which will reverse the driving, and this may be accomplished readily by using a differential having its large gear axially reversed in position.

Particular advantages of the invention may be generally mentioned as follows. In the first place, due to the elimination of movement between the differential drives and the engine or pasengers in the vehicle, it is possible to lower the silhouette of the car without decreasing the critical ground clearance. Secondly, it is not necessary to offset the differential and engine in a lateral direction as the invention permits disposing the engine directly over the differential and centrally in a lateral direction so that the shafts extending to the wheels may be identical in length. Thirdly, the stability of the vehicle is increased due to the independent wheel suspension and the lowering of the center of gravity. Again, the design permits building either a front or rear engine arrangement without major changes of production units. Therefore, the invention not only provides greater stability, lower center of gravity, lower height of vehicle, but also versatility due to interchangeability of parts and a lower cost of production due to the number of parts that may be made alike and interchanged regardless of whether the engine is a front engine type or a rear engine type.

Although only one form of the invention has been described in detail, it will be apparent to those skilled in the art that various modifications may be made without departing from the scope of the appended claims.

What I claim is:

1. A vehicle comprising a chassis frame, a pair of wheels at each end of the frame at opposite sides respectively, individual springing means having arms connecting each wheel to the frame and disposed outside the chassis frame and disposed lengthwise along the sides thereof, a differential mounted on the frame laterally and centrally between each pair of wheels, a shaft connecting each wheel to the differential at that end of the frame, an engine mounted on the frame at one end and above the one differential at that end, and drive means connecting the engine to the differentials, said engine and one differential being mounted in vertically superimposed and relatively fixed position on the frame and in vertically close relation.

2. A vehicle comprising a chassis frame, a pair of wheels at each end of the frame at opposite sides respectively, individual springing means connecting each wheel to the frame and disposed outside the frame and swingable in vertical planes parallel to the longitudinal axis of the frame, a differential mounted on the frame laterally and centrally between each pair of wheels, a shaft connecting each wheel to the differential at that end of the frame, an engine mounted on the frame at one end and above the one differential at that end, and drive means connecting the engine to the differentials, said engine and said one differential being mounted in vertically superimposed and relatively fixed positions on the frame and in vertically close relation, whereby the center of gravity of the car may be lowered.

3. A vehicle comprising a chassis frame, a pair of wheels at each end of the frame at opposite sides respectively, individual springing means connecting each wheel to the frame, said springing means comprising cranks lying outside the frame, and swinging in vertical planes parallel to the longitudinal axis of the frame, a differential mounted on the frame laterally and centrally between each pair of wheels, a shaft connecting each wheel to the differential at that end of the frame, an engine mounted on the frame at one end and above the one differential at that end, and drive means connecting the engine to the differentials, said engine and one differential being mounted in vertically superimposed and relatively fixed position on the frame and in vertically close relation, said shafts between the differentials and wheels being interchangeable one with another.

4. The combination of a vehicle frame, front and rear wheel supports, wheels rotatable thereupon, a parallel motion crank suspension for each of said wheel supports, said suspension including a pair of crank arms pivoted on the frame and swingable in a vertical plane parallel to the longitudinal axis of the frame, independent spring means for each suspension, a front end differential and a rear end differential, each supported rigidly on the vehicle frame between corresponding wheel supports, a transfer case mounted rigidly on the frame between said differentials, a driving motor carried rigidly on the frame and disposed over one of said differentials, said motor having a clutch and change speed transmission at its inner end with a drive shaft from the transmission to the transfer case, said motor, said differentials and said transfer case lying in the median vertical plane of the frame, a propeller shaft from the transfer case to the rear differential, a propeller shaft from the transfer case to the forward differential and driving means for each of the wheels extending from the differentials to the wheel supports, said driving means comprising interchangeable drive shafts with a universal joint at each end of each of said drive shafts.

5. The combination of claim 4 characterized by the engine being disposed over the front differential, and having its shaft to the transfer case substantially axially in alignment with the propeller shaft from the transfer case to the rear differential whereby the drive from the engine through the transfer case to the rear differential is on substantially a straight line.

6. The combination of a vehicle frame having two longitudinal members each with a drop center section, the central drop sections being branched, each member comprising along its center an outer longitudinal branch and an inner longitudinal branch, a transfer case connected to and mounted between the two inner branches, a differential mounted on the rear end and a differential mounted on the front end of the frame, shafts connecting the transfer case and said differentials, individually sprung wheel suspensions comprising cranks having their arms swingable vertically parallel to the longitudinal axis of the frame and lying outside the end portions of the side frame members, wheels carried by said cranks, driving shafts from the differentials to the wheels, said shafts being of substantially equal length, and an engine mounted on the frame above the front differential and connected to the transfer case.

7. A vehicle comprising a chassis frame, an engine mounted on the frame at one end thereof, a transfer box located on the frame intermediate the ends of the latter, a drive shaft connecting the engine to the transfer box, wheel driving shafts connected to the transfer box and extending rearwardly and forwardly, respectively, along the longitudinal center line of the frame, a pair of steerable wheels supporting the front end of the frame, a pair of wheels supporting the rear end of the frame, each of said front and rear wheels having an independent wheel suspension comprising cranks lying outside of and lengthwise of the chassis frame, and each of said front and rear wheels being operable to allow vertical movement of the chassis frame without adversely affecting the normal action of the steerable wheels, a differential on the front part of the frame and connected to the front end of the forwardly extending driven shaft, a differential on the rear part of the frame and connected to the rear end of the rearwardly extending driven shaft, and driven shafts extending from each differential to the wheels at the corresponding end of the frame, the driven shafts connected to all the wheels being interchangeable one with another.

8. The combination of a vehicle frame comprising two longitudinal side frame members connected together transversely at front and rear, said side frame members being dropped along their central parts, the central part of each side frame member being split longitudinally, the split portion providing parallel branches, the inner branches of said members being adjacent one another and the outer branches providing widely spaced vehicle body supports; front and rear wheel supports; wheels rotatable on said supports; a parallel motion crank suspension for each of said wheel supports, said suspension including a pair of crank arms pivoted on the frame and springable in a vertical plane parallel to the longitudinal axis of the frame; independent spring means for each suspension; a front end differential and a rear end differential each supported rigidly on the vehicle frame between corresponding wheel supports; a transfer case rigidly supported on its opposite side by the inner branches of said frame members; a driving motor carried rigidly on the frame and disposed over one of said differentials, said motor having a clutch and change speed transmission at its inner end with a drive shaft from the transmission to the transfer case; said motor, said differential and said transfer case lying in the median vertical plane of the frame; a propeller shaft from the transfer case to the rear differential; and a propeller shaft from the transfer case to the forward differential; and driving means for each of the wheels extending from the differential to the wheel supports, said driving means comprising interchangeable drive shafts with a universal joint at each end of each of said drive shafts.

9. A vehicle comprising a chassis frame, a pair of steerable wheels supporting the front end of the frame, a pair of wheels supporting the rear end of the frame, each of said front and rear wheels having an independent wheel suspension comprising cranks lying outside of and lengthwise of the chassis frame, each of said front and rear wheels being operable to allow vertical movement of the chassis frame without adversely affecting the normal action of the steerable wheels, a differential mounted on the frame laterally and centrally between each pair of wheels, a shaft connecting each wheel to the differential at the corresponding end of the frame, an engine mounted on the frame at one end and above the one differential at that end, and drive means connecting the engine to the differentials, said engine and one differential being mounted in a vertically superimposed and relatively fixed position on the frame and in vertically close relation.

KARL K. PROBST.

REFERENCES CITED

The following references are of record in the file of this patent:

UNITED STATES PATENTS

| Number | Name | Date |
|---|---|---|
| 1,295,793 | Rautenstrauch | Feb. 25, 1919 |
| 1,790,640 | Cappa | Feb. 3, 1931 |
| 1,932,786 | Johnson | Oct. 31, 1933 |
| 1,936,318 | Windberger | Nov. 21, 1933 |
| 1,976,071 | Hoffman | Oct. 9, 1934 |
| 2,035,032 | Wagner | Mar. 24, 1936 |
| 2,134,387 | Zimka et al. | Oct. 25, 1938 |
| 2,203,342 | Sloman et al. | June 4, 1940 |
| 2,228,581 | Olen | Jan. 14, 1941 |
| 2,286,609 | Ledwinka | June 16, 1942 |

FOREIGN PATENTS

| Number | Country | Date |
|---|---|---|
| 784,475 | France | Apr. 29, 1935 |